United States Patent [19]

Iida et al.

[11] 3,880,794
[45] Apr. 29, 1975

[54] POLYVINYL CHLORIDE PLASTISOL COMPOSITION

[75] Inventors: Eiichi Iida, 7, Takashimadal, Kanagawa-ku, Yokohama-shi, Kanagawa-ken; Toshio Sano, 111, 2-chome, Furuichiba, Kawasaki-shi, Kanagawa-ken, both of Japan

[73] Assignees: Nippon Zeon Co., Ltd.; E. C. Chemical Ind. Co., Ltd.

[22] Filed: Aug. 24, 1973

[21] Appl. No.: 391,313

[52] U.S. Cl. .................. 260/30.4 R; 260/17.4 SG; 260/30.6 R; 260/31.6; 260/31.8 R
[51] Int. Cl. ........................................... C08f 45/34
[58] Field of Search..... 260/17.4 SG, 30.4 R, 340.7, 260/340.9, 45.8 A

[56] References Cited
UNITED STATES PATENTS

| | | | |
|---|---|---|---|
| 2,922,776 | 1/1960 | Wulff | 260/45.8 A |
| 3,096,345 | 7/1963 | Hechenbleikner | 260/340.7 |
| 3,380,948 | 4/1968 | Ericson | 260/45.8 A |
| 3,661,834 | 5/1972 | Pasley | 260/31.8 R |
| 3,705,836 | 12/1972 | Francis | 161/116 |

*Primary Examiner*—Joseph L. Schofer
*Assistant Examiner*—P. R. Michl

[57] ABSTRACT

Polyvinyl chloride plastisol compositions containing as gelling agents cyclic acetals which are polyhydric alcohol acetals of benzaldehyde are disclosed.

4 Claims, 1 Drawing Figure

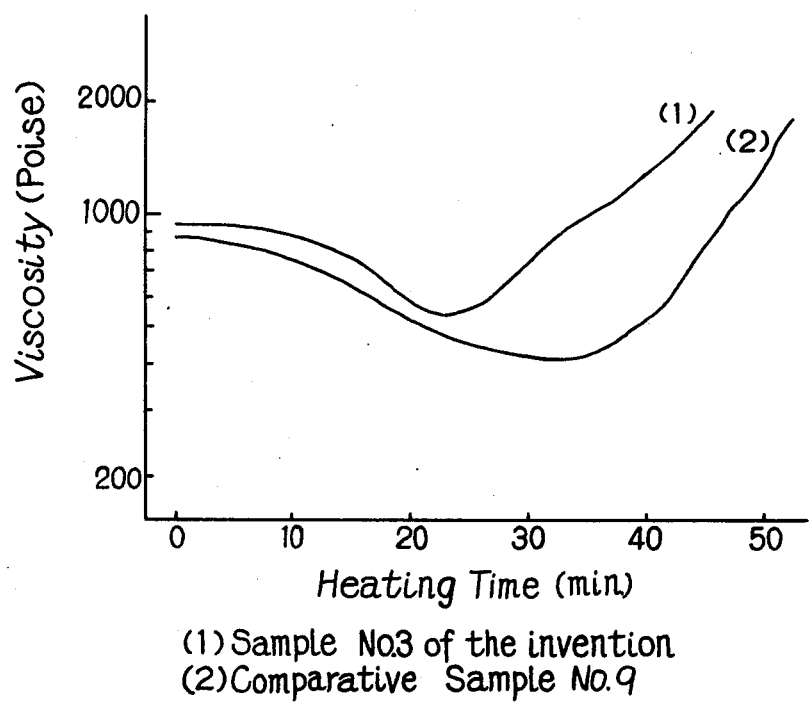
(1) Sample No.3 of the invention
(2) Comparative Sample No.9

POLYVINYL CHLORIDE PLASTISOL COMPOSITION

This invention relates to a polyvinyl chloride plastisol composition having high viscosity and excellent thixotropy, as well as good transparency and heat stability.

In processing of a polyvinyl chloride paste (PVC paste) which may be a polyvinyl chloride plastisol composition (referred to as PVC plastisol hereafter), sometimes it is required for the PVC plastisol to have high viscosity and excellent thixotropy as its flow properties. The term "thixotropy" used herein means the phenomenon that reversible conversion between sol and gel occurs by mechanical impulse without any change in temperature. Thus, the thixotropic property of is characterized by reversible isothermal transformation between sol and gel.

A number of examples of PVC paste processing for which is required the above-mentioned characteristics (high viscosity and excellent thixotropy) and the technical advantages thereof are given below.

| (1) Dip processing | Easy in processing, no dripping and increased weight of pick-up |
| (2) Coating processing | Easy in processing, less penetration of sol into fabric coating and no dripping |
| (3) Slush molding | Easy in processing, uniformity in the layer thickness obtained, no dripping and increased weight of pick-up |
| (4) Sealant processing | Easy processing, no dripping and prevention of sol sagging at the time of curing |

The expression "no dripping" used in the above means to prevent the tendency of the PVC plastisol to flow or drain away from the surface to which it has been applied when such surface is not disposed in the horizontal plane.

It has been heretofore proposed to increase the viscosity of the PVC plastisol and/or to render such plastisol thixotropic by incorporating therein a gelling agent (sometimes referred to as a thickening agent or a thixotropic agent) for PVC paste processing. Such gelling agents are known to be metallic soap, organic bentonite, silicic acid, $CaCO_3$ or silica material (cf. U.S. Pat. No. 3,525,689). However, these known gelling agents have defects in that they can not increase the viscosity and thixotropy of PVC plastisol unless they are used in such relatively large amounts that they may render final products opaque or they adversely affect heat stability of the final products.

Therefore, it is required to provide novel gelling agents for PVC processing which can increase the viscosity and thixotropy of the PVC plastisol even at an extremely low level without any adverse influence on the transparency and heat stability of final products.

Accordingly, it is an object of this invention to provide a PVC plastisol composition having high viscosity and excellent thixotropy, as well as transparency and heat stability by incorporating therein relatively small amounts of certain organic compounds defined hereinafter.

The above-mentioned object of the present invention has been achieved on the basis of our finding that the organic compounds are free from any disadvantages which may be encountered by use of any one of the prior art gelling agents and is extremely effective as a gelling agent for PVC paste processing.

The organic compounds usable as a gelling agent in the present invention are cyclic acetals, which typically include the polyhydric alcohol acetals of benzaldehyde or its ring substituted derivatives, said polyhydric alcohol having 5 to 7 hydroxyl groups.

Accordingly, this invention relates to a polyvinyl chloride plastisol composition comprising a polyvinyl chloride resin, a plasticizer and a cyclic acetal as gelling agent, said cyclic acetal being one member selected from the polyhydric alcohol acetals of benzaldehyde or its nucleically substituted derivatives, said polyhydric alcohol having 5 to 7 hydroxyl groups, said gelling agent being in an amount sufficient to increase the viscosity of the mixture of the polyvinyl chloride resin and the plasticizer.

In the molecular structures of the cyclic acetal compounds defined above, the alcohol portion which is believed to have been acetalized by unsubstituted or substituted benzaldehyde preferably is sugar alcohol of the formula, $HOCH_2(CHOH)_nCH_2OH$, wherein $n$ is 3 to 5, preferably 3 to 4, such as xylitol, sorbitol or mannitol. Preferable as the ring substituents for benzaldehyde are halogen, alkyl group with one to eight carbon atoms and preferably with one to four carbon atoms, alkoxyl group with one to eight carbon atoms and preferably with one to four carbon atoms.

As is clear from the foregoing, preferable cyclic acetals usable as gelling agents according to the present invention are sugar alcohol acetals of benzaldehyde which may be ring substituted, said sugar alcohol having the formula, $HOCH_2(CHOH)_nCH_2OH$, wherein $n$ is 3 to 5, preferably 3 to 4. A number of examples are given below.

Dibenzylidene-xylytol (= xylitol acetal of benzaldehyde), dibenzylidene-sorbitol (= sorbitol acetal of benzaldehyde) and dibenzylidene-mannitol (= mannitol acetal of benzaldehyde), as well as their derivatives wherein the benzene nucleus in either one or both of two benzylidene moieties has been substituted with chlorine, bromine, alkyl group (e.g. methyl, ethyl, propyl, isopropyl, n-butyl, isobutyl, sec-butyl, octyl, etc.) or/and alkoxy group (e.g. methoxy, ethoxy, n-propoxy, isopropoxy, buthoxy, octoxy, etc.).

One of these typical cyclic acetals has the following chemical structure

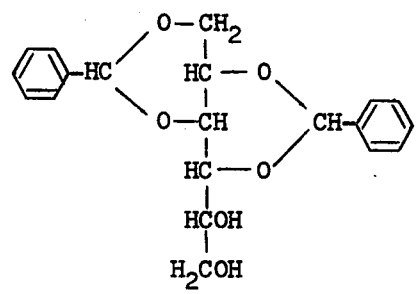

1,3;2,4-dibenzylidene-sorbitol (1,3;2,4 sorbitol acetal of benzaldehyde)

In the above-mentioned cyclic acetal compound, the alcohol portion thereof is sorbitol, and the aldehyde portion thereof is benzaldehyde.

The cyclic acetals of the present invention can be prepared in any method which per se is known for the preparation of acetals. Such method is described, for example, in Kirk-Othemer, "Encyclopedia of Chemical Technology," Vol. 1, pages 579 and 580.

The gelling agent used in the present invention exhibits such effects as effectively increasing the viscosity of said plastisol and, at the same time, improving the thixotropy thereof, even at a low level.

The gelling agent does not show any adverse influence on the transparency of products, and according to the present invention, it is therefore possible to obtain polyvinyl chloride paste products having transparency far superior to that of the products obtained when a prior art gelling agent is used.

Further, the gelling agent used in the present invention can exhibit an excellent effect as a heat stabilizer as is clear from Example 5 which will be seen later. In addition, when it is used together with any other heat stabilizer, PVC plastisol and products having remarkably excellent heat stability can be obtained due to synergism. Thus, the gelling agent used in the present invention exhibits such advantage which can not be obtained by the prior art gelling agents.

According to the present invention, the amount of the gelling agent added can be suitably selected depending on the formulations of PVC plastisol (polyvinyl chloride resin, plasticizer, diluent, filler, pigment, etc.) and processing method employed. In general, it is within the range of 0.02-1% by weight, preferably 0.05-0.7% by weight, and more preferably 0.1-0.6% by weight, based on the total weight of the polyvinyl chloride resin and plasticizer.

In the preparation of a PVC plastisol composition containing a gelling agent according to the present invention, it is preferrable to disperse the gelling agent uniformly into said composition.

The method of adding the gelling agent into the PVC plastisol may be carried out as follows: When preparing the PVC plastisol according to a known process:

(1) To add the gelling agent itself into the plastisol, or
(2) To add the required amount of a previously prepared plasticizer-gelling agent master batch obtained by dissolving the gelling agent in the plasticizer into the plastisol, or
(3) To add the gelling agent into the plastisol according to any other proper method as desired.

In the foregoing, the preparation of the PVC plastisol may be carried out according to a known process. Stated more specifically, it is carried out by adding a plasticizer into polyvinyl chloride paste resin and further blending the mixture properly with a diluent, heat stabilizer, lubricant, filler, coloring agent, foaming agent, volume-increasing coarse particulate resin, foam stabilizer, wetting agent, etc., with stirring, and then de-aerating the blend as required.

A polyvinyl chloride resin to be used in the present invention preferably is polyvinyl chloride paste resin (vinyl chloride homopolymer or copolymer).

As a plasticizer for use in the present invention, well-known plasticizers for example, phthalic acid ester type plasticizer such as dibutyl phthalate, dioctyl phthalate, etc., a phosphoric acid ester type plasticizer such as tricresyl phosphate, trioctyl phosphate, etc., an adipic acid ester type plasticizer such as dioctyl adipate, etc., an epoxy type plasticizer such as epoxy butyl stearate, a glyceride type plasticizer, and a polyester type plasticizer are involved. Further, as a diluent for use in the present invention, paraffinic and naphthenic hydrocarbons, aromatic hydrocarbon and terpene, etc., are involved. The plasticizer is used usually in amount of 40-600 parts by weight per 100 parts by weight of the polyvinyl chloride resin. If a very highly plasticized polyvinyl chloride paste product is desired, the plasticizer amounting to more than 600-2,000 parts by weight per 100 parts by weight of the polyvinyl chloride is used. The amount of the plasticizer to be used may be, of course, controlled properly according to the purpose for use. Further, a part of the plasticizer may be substituted by the above-mentioned diluent.

The accompanying drawing shows changes in the viscosities of the PVC plastisols according to Example 2 of the present invention and comparative examples against the length of heating time.

Further understanding of the composition of the present invention will be obtained from the following examples which are intended to illustrate the invention but not limit the scope thereof, parts being by weight unless otherwise specified.

| Example 1 | |
|---|---|
| Polyvinyl chloride paste resin (Nipeon A-21, Nippon Zeon Co., Ltd) | 100 part |
| Dioctylphthalate (DOP) | 80 do. |
| Gelling agent (Table 1) | Variable |

A plastisol was prepared based on the above formulation in conventional manner, and its flow properties were measured.

Further, in the preparation of samples of the present invention, 5 parts of the gelling agent is dissolved uniformly into 100 part of DOP at 150° C and then cooled to a normal temperature to prepare previously a plasticizer (DOP)-gelling agent master batch. A required amount of the master batch is added to DOP in such an amount to give its desired level in the blend and then the thus obtained mixture of DOP and the gelling agent was blended with polyvinyl chloride paste resin to give a plastisol.

A method of measuring flow properties of plastisol is as follows: Viscosity of each plastisol composition was measured at 25° C by Brookfield Synclo-Lectric Viscometer using a Spindle No. 4 at 12 r.p.m. and 6 r.p.m. $V'_6$ is a viscosity measured at 6 r.p.m., and $V'_{12}$ is a viscosity measured at 12 r.p.m. Yield value is expressed by the equation $12(V'_6 - V'_{12})/100$.

The results are set forth in Table 1.

Table 1

| Sample | Gelling agent | | Viscosity | | Thixotropic Index | |
| | Type | Amount | $V'_6$ | $V'_{12}$ | Yield (dyne/cm²) | $V'_6/V'_{12}$ |
|---|---|---|---|---|---|---|
| (Comparative Samples) | | | | | | |
| 1 | — | 0 | 28 | 24 | 30 | 1.18 |
| 2 | Aluminum di-stearate | 3.0 | 238 | 171 | 804 | 1.40 |
| 3 | Organo calcium complex " | 3.0 | 112 | 75 | 444 | 1.49 |

Table 1—Continued

| Sample | Gelling agent Type | Amount | Viscosity $V'_6$ | $V'_{12}$ | Thixotropic Index Yield (dyne/cm²) | $V'_6/V'_{12}$ |
|---|---|---|---|---|---|---|
| 4 | Silicic acid hydrate (powder) [1] | 3.0 | 104 | 76 | 330 | 1.37 |
| 5 | Silicic acid anhydrate (powder) [3] | 3.0 | 650 | 424 | 2718 | 1.54 |
| 6 | Organo bentonite [4] | 0.3 [5] | 35 | 30 | 54 | 1.17 |
| 7 | do. | 0.5 | 45 | 37 | 92 | 1.22 |
| 8 | do. | 1.0 | 73 | 57 | 186 | 1.28 |
| 9 | do. | 3.0 | 829 | 106 | 4160 | 1.72 |
| (Samples of present invention) | | | | | | |
| 1 | Dibenzylidene-sorbitol | 0.3 | 321 | 200 | 1430 | 1.60 |
| 2 | do. | 0.5 | 496 | 288 | 2500 | 1.72 |
| 3 | do. | 1.0 | 5580 | 2830 | 11000 | 1.97 |
| 4 | Dibenzylidene-xylitol | 0.5 | 387 | 219 | 2020 | 1.77 |
| 5 | Di-p-methoxybenzylidene-sorbitol | 0.5 | 427 | 244 | 2190 | 1.75 |
| 6 | Di-p-chlorobenzylidene-sorbitol | 0.5 | 502 | 285 | 2600 | 1.76 |
| 7 | Di-p-methylbenzylidene-sorbitol | 0.5 | 395 | 225 | 2040 | 1.76 |
| 8 | Di-p-methylbenzylidene-xylytol | 0.5 | 336 | 197 | 1670 | 1.71 |
| 9 | Di-P-methoxybenzylidene-xylitol | 0.5 | 341 | 198 | 1720 | 1.72 |
| 10 | Di-p-isobutylbenzylidene-xylitol | 0.5 | 276 | 181 | 1140 | 1.72 |

[1] New Ircogel 900, produced and sold by Buschman Products Inc.
[2] Hisil 233, produced and sold by Columbia Southern Chem. Co.
[3] Aerosil, produced and sold by DEGUSSA Co.
[4] DOP paste containing 15% by weight of organo bentonite ORBEN-P produced by Shiraishi Kogyo Co.
[5] The amount of organo bentonite added.

It can readily be seen from the data set forth in Table 1 that the small amount of the gelling agent of the present invention results in a substantial increase in viscosity and in thixotropy when incorporated in PVC plastisol as contrasted to the known gelling agent in PVC plastisol.

EXAMPLE 2

Each of the plastisols obtained by using the sample No. 3 of the present invention and by using the comparative sample No. 9 which were prepared in the Example 1 was placed into an oil bath kept at 90° C to measure the change in sol viscosity against the lapse of time (temperature of sol is gradually increased) by means of a Brookfield Synchro-Lectric Viscometer using a Spindle No. 1 at 0.3 r.p.m.

The results obtained thereby are shown in the attached drawing. Their lowest viscosities and the time (minutes) required until they reach their lowest viscosities are shown in Table 2.

It can be seen from the above table that, when plastisol is heated (this can be regarded as the condition of sol when plastisol is cured in the practical paste processing.), the sample of the present invention can reach its lowest viscosity much faster than the comparative sample, and also its absolute value of viscosity is higher than that of the latter. Therefore, it is obvious that the sample of the present invention is effectively prevented from plastisol dripping at the time of curing.

EXAMPLE 3

In addition to Example 2, this example further serves to show that the sample of the present invention is excellent in the dripping characteristics.

About 1.6 grams of the plastisol prepared in the Example 1 was put on the one end of an aluminum plate which has grooves formed in the flow direction of sol. The plate was inclined at an angle of 25°, and at the same time, it was put on in an oven kept at a constant temperature to measure the sagged length of sol untill Table 2

| PVC plastisol | Gelling agent used (part) | Initial viscosity $V'_6$ (poise) | Time requires until lowest viscosity is reached (min.) | Lowest viscosity of sol (poise) |
|---|---|---|---|---|
| Comparative Sample No. 9 | Organo bentonite (3.0) | 880 | 33 | 420 |
| Sample No. 3 of present invention | Dibenzylidene-sorbitol (1.0) | 950 | 23 | 540 |

Table 3

|  | [Comparative Sample No.] Gelling agent (part) | Sagged length at 150°C (cm) | Sagged length at 200°C (cm) |
|---|---|---|---|
| Comparative Examples | 1. NO | More than 25cm | More than 25cm |
|  | 2. Aluminum di-stearate (3.0) | 20 | 17 |
|  | 3. Organo calcium complex (3.0) | 20 | 18 |
|  | 4. Silic acid hydrate (3.0) | 20 | 16 |
|  | 5. Silic acid anhydrate (3.0) | 3 | 2 |
|  | 9. Organo bentonite (3.0) | 0 | 1 |
| Example of present invention | [Sample No. of present invention] 2. Dibenzylidene-sorbitol (0.5) | 0 | 0 | the its sagging ceases due to its curing. The results obtained are shown in Table 3.

It can be seen that the gelling agent according to the present invention can exhibit an excellent characteristic of preventing dripping even when it is added into plastisol in such a small amount as one sixth of the gelling agent (comparative sample No. 6) which has the best effect among the gelling agents of comparative examples. This means that addition of an extremely small amount of the gelling agent according to the present invention is not only satisfactory to prevent PVC plastisol from dripping at the time of immersion processing, but also is effective for anti-sagging of sol during the heating step in the case where it is used as a sealant.

EXAMPLE 4

A test tube covered by a knitted fabric was dipped into one of the PVC plastisols wherein the amount of the gelling agent is fixed at 2 parts and their viscosity is equalized by controlling the amount of DOP. Thereafter, the test tube was taken out and allowed to cure at 190°C for 6 minutes to observe whether or not the sol penetrates the back surface of the knitted fabric, i.e., non-penetrability. Further, the experiment was made under the condition when the knitted fabric is not stretched in particular. The formulation, viscosity, yield value and penetrability of the sol are summarized below in Table 4.

Table 4

|  | Sample of present invention | Comparative sample |
|---|---|---|
| (Formulation) |  |  |
| Polyvinyl chloride paste resin | 100 part | 100 part |
| DOP | 170 part | 140 part |
| Dibenzylidene-sorbitol | 2.0 part | — |
| Organic bentonite | — | 2.0 part |
| Viscosity of sol (BM type viscometer; No. 4, V'$_{60}$) (centi-poise) | 5180 | 5150 |
| Yield Value (dyne/cm) | 1650 | 450 |
| Penetrability of sol into the back surface of knitted fabric | No penetration | Penetrated |

It can be seen from the above table that the gelling agent of the present invention can hold a plasticizer much greater than the gelling agent of the comparative sample, and has an extremely high yield value (about 3.7 times of that of the comparative sample) together with an excellent non-penetrability to fabric. This means that the sample of the present invention can be effectively used for coating sol to fabric gloves and for production of polyvinyl chloride paste leather.

EXAMPLE 5

A. The paste sol prepared in the Example 1 was applied in the thickness of 2 mm on an aluminum plate. The plate was placed in an oven (190°C) to determine heat stability. The result obtained is shown in Table 5.

Table 5

|  |  | Evaluation of heat stability | | |
|---|---|---|---|---|
|  |  | After 10 min. | After 15 min. | After 20 min. |
| Comparative Examples | [Comparative Sample No.] Gelling agent (part) |  |  |  |
|  | 1. NO | 1 | 2 | 3 |
|  | 2. Aluminum di-stearate (3.0) | 0 | 1 | 3 |
|  | 3. Organo calcium complex (3.0) | 0 | 1 | 2 |
|  | 4. Silic acid hydrate (3.0) | 0 | 1 | 4 |
|  | 5. Silic acid anhydrate (3.0) | 1 | 2 | 3 |
|  | 9. Organo bentonite (3.0) | 0 | 3 | 4 |
| Examples of present invention | [Sample No. of present invention] 2. Dibenzylidene-sorbitol (0.5) | 0 | 0 | 1 |
|  | 4. Dibenzylidene-xylitol (0.5) | 0 | 0 | 1 |
|  | 8. D-p-methylbenzylidene-sorbitol (0.5) | 0 | 0 | 1 |

The rating for heat stability is as follows:
0 NO change (colourless)
1 Extremely light yellow or red colour
2 Light yellow or red colour
3 Yellow or red colour
4 Pseudo-brown It can be seen from the above table that the samples of the present invention are far superior in heat stability to those of the comparative samples using well-known gelling agents. In other words, the gelling agents of the present invention have an excellent heat stability. Further, with the samples of the present invention, transparency of cured film remained almost clear, but with the comparative samples, the cured film became translucent.

B. For the synergistic effect of the gelling agents used in the present invention, and heat stabilizers a sol having a composition as shown in Table 6 was prepared. Heat stability was tested at 190° C in the similar manner as in (A). The results obtained thereby are shown in Table 6.

Table 6

| Formulation (part) | | | | Rating of heat stability after the indicated period | | | | |
|---|---|---|---|---|---|---|---|---|
| Polyvinyl chloride resin (Zeon 121) | DOP | Gelling agent* | Heat stabilizer** | After 10 min. | After 20 min. | After 30 min. | After 40 min. | After 50 min. |
| 100 | 80 | 0 | 0 | 0 | 2 | 3 | 3 | 4 |
| do. | do. | 0.5 | 0 | 0 | 0 | 1 | 2 | 3 |
| do. | do. | 0 | 3 | 0 | 0 | 0 | 0 | 4 |
| do. | do. | 0.5 | 3 | 0 | 0 | 0 | 0 | 1 |

*Dibenzylidene-sorbitol
**Liquid stabilizer of the Cd-Ba-Zn type

It can be seen from the above table that the gelling agent of the present invention in combination with the well-known heat stabilizer improves the heat stability of the plastisol remarkably by their synergism. Therefore, it is possible to reduce the amount of heat stabilizers which are usually expensive.

What we claim is:

1. A polyvinyl chloride plastisol composition which comprises a mixture of polyvinyl chloride resin and a plasticizer together with a cyclic acetal, as gelling agent, said cyclic acetal being selected from the group consisting of dibenzylidene xylitol, dibenzylidenesorbitol and derivatives thereof wherein the benzene ring is substituted with halogen, an alkyl group of 1-8 carbon atoms or an alkoxy group of 1-8 carbon atoms, the amount of said cyclic acetal being 0.02-1% by weight based on the weight of the mixture of the polyvinyl chloride resin and the plasticizer.

2. The composition of claim 1, wherein said cyclic acetal, is dibenzylydene-xylytol or dibenzylydenesorbitol.

3. The composition of claim 1, wherein the amount of plasticizer is 40-600 parts by weight per 100 parts by weight of the polyvinyl chloride resin.

4. The composition of claim 1 wherein the amount of the plasticizer is 600-2,000 parts by weight of the polyvinyl chloride composition.

* * * * *